US008855050B2

(12) United States Patent  
Chen (10) Patent No.: US 8,855,050 B2  
(45) Date of Patent: Oct. 7, 2014

(54) SOFT STATE FRAMEWORK FOR MOBILE WSN ROUTING

(76) Inventor: Weixiang Chen, Westford, MA (US)

( * ) Notice: Subject to any disclaimer, the term of this patent is extended or adjusted under 35 U.S.C. 154(b) by 600 days.

(21) Appl. No.: 13/223,936

(22) Filed: Sep. 1, 2011

(65) Prior Publication Data

US 2012/0057526 A1    Mar. 8, 2012

Related U.S. Application Data

(60) Provisional application No. 61/379,408, filed on Sep. 2, 2010.

(51) Int. Cl.
*H04W 4/00*      (2009.01)
*H04L 12/28*     (2006.01)
*H04W 40/24*     (2009.01)
*H04W 84/18*     (2009.01)

(52) U.S. Cl.
CPC .............. *H04W 40/24* (2013.01); *H04W 84/18* (2013.01)
USPC ............................ 370/328; 370/338; 370/406

(58) Field of Classification Search
None
See application file for complete search history.

(56) References Cited

U.S. PATENT DOCUMENTS

| | | | |
|---|---|---|---|
| 7,378,953 | B2 | 5/2008 | Coronel |
| 7,590,611 | B2 | 9/2009 | Hur |
| 7,675,863 | B2 | 3/2010 | Werb |
| 7,701,858 | B2 | 4/2010 | Werb |
| 7,782,188 | B2 | 8/2010 | Coronel |
| 2008/0164996 | A1 | 7/2008 | Coronel |
| 2008/0247539 | A1 | 10/2008 | Huang |
| 2009/0029650 | A1* | 1/2009 | Shon et al. ...................... 455/68 |
| 2009/0154481 | A1 | 6/2009 | Han |
| 2009/0207769 | A1* | 8/2009 | Park et al. ..................... 370/311 |
| 2011/0033054 | A1 | 2/2011 | Morchon |
| 2011/0317017 | A1* | 12/2011 | Shin et al. ..................... 348/159 |

* cited by examiner

*Primary Examiner* — Chirag Shah
*Assistant Examiner* — Srinivasa Reddivalam
(74) *Attorney, Agent, or Firm* — Lambert & Associates; Gary E. Lambert; David J. Connaughton, Jr.

(57) ABSTRACT

A soft state framework to support routing functionality in a mobile wireless sensor network is provided. This invention allows each node of the wireless sensor network to move in random directions in a three dimensional space. The invention seeks to minimize resource consumption while optimizing routing functionality in a mobile condition.

19 Claims, 6 Drawing Sheets

SOFT STATE FRAMEWORK FOR MOBILE WSN ROUTING

BACKGROUND OF THE INVENTION

1. Field of the Invention

The present invention relates generally to routing protocols. More particularly, the present invention relates to a soft state routing protocol for mobile wireless sensors in a wireless sensor network.

2. Description of Related Art

A wireless sensor network (WSN) is a self-organizing wireless network that consists of distributed devices with sensors commonly referred to as "nodes". The sensors are of application specific. They are used for monitoring environmental conditions, such as sound, temperature, vibration, pressure, motion or pollutants at different locations. The wireless sensor network was originally motivated by military applications. It is now widely used in many industrial, agricultural, medical and other civilian applications.

In addition to the sensors, each device in a WSN is equipped with elements such as a radio transceiver, microcontroller, flash memory, antenna, energy source and so on. A WSN device is typically low data rate, low cost and low power devices. The low cost of a WSN is a constraint on system resources such as energy, memory, processor and bandwidth.

IEEE 802.15.4 is a standard which specifies the physical layer and media access control for Wireless Sensor Network. In this standard, there are two types of multi-access mechanisms: beacon and non-beacon. In a beacon enabled network, nodes transmit in specific time slots. The sink node, also referred to as the coordinator periodically sends a beacon frame. All nodes in the WSN are expected to synchronize to this frame. Each node is assigned a specific slot to transmit and receive its data. There is also a common slot during which all nodes compete to use the channel. In a non-beacon enabled network, all nodes in a network can transmit at any time when the channel is available.

There are usually three types of WSN devices, i.e. the coordinator (or sink), router and end device. The first two devices have routing functionality. Both devices have ability to find proper routes to forward packets to desired destinations. An end device has no routing ability, it only communicates with a specific router that is called the parent of the end device.

If the routing condition changes so that the original path becomes unavailable, the routers are able to find a new path to deliver the packets to the destination. Currently, the WSN devices are usually installed in fixed locations. However, if the devices were installed inside a moving target, the routing among the wireless nodes becomes a challenge.

Currently, there are a few routing solutions for partially mobile WSN:

Mobile base station (MBS) based solutions: A MBS is a mobile sink that changes its position within a WSN. The packets are sent to the MBS via relay node.

Mobile data collector (MDC) based solutions: A MDC is a mobile sink that visits sensors. The packets are buffered at source nodes until the MDC visits the sensors. The data is sent over to the MDC without relay nodes.

Rendezvous based solutions: The data is sent to rendezvous nodes that are closer to the mobile sink. The packets are buffered at the rendezvous nodes until the sink receives them.

However, these solutions are restricted in that all the nodes must be fixed except the sink node. Therefore, the mobility is substantially limited.

Further some basic soft state refreshment methods exist such as:

A specific timer that is associated with each individually sent refreshing message. This approach is inefficient and consumes copious resources for refreshing processes.

In another soft state method, the refreshing messages are flooded to the network altogether once the timer fires. This approach can overwhelm local devices, creating broadcast storms over the network, hence a packet can be lost. On the other hand, the refreshing process is in sleeping mode and does nothing before the timer triggers. This brute force approach eliminates the possibility to customize the refreshment.

Another soft state method involves bundling a subset of the refreshing messages into a single packet which is sent to the wire when the timer fires. This is a compromise to the previous two methods. Still, this approach cannot provide a resolution to take care of specific requirements.

The third approach is an improvement to the previous two ways, however, in general the current approaches perform refreshing action with very limited intelligence.

Therefore, what is needed is a routing protocol that may efficiently allow for all nodes to be mobile. Moreover, a more efficient soft state solution may be desirable to enhance routing functionality in a mobile WSN.

SUMMARY OF THE INVENTION

The subject matter of this application may involve, in some cases, interrelated products, alternative solutions to a particular problem, and/or a plurality of different uses of a single system or article.

Routing protocols are the critical modules and major resource consumers of the software in a Wireless Sensor Network (WSN). These modules require a significant amount of system resources including electric power. It is a big challenge to provide routing functionality in a WSN because the wireless sensor nodes are the devices of low data rate, low cost and low power. It is even more difficult in a mobile WSN where the nodes are moving in random directions. There are many more variables in a WSN. It requires extra resources and mechanisms. Currently, most of the discussions about mobile WSN are restricted to the sink nodes only. The rest of the nodes are not movable.

This invention provides a soft state framework to support routing functionality in a fully mobile WSN where each node can move in random directions. This invention seeks to minimize the resource consumption in the design while delivering optimal functionality.

The soft state approach is widely used in network signaling protocols. A soft state is maintained by periodical refreshment. The state goes away if it fails to receive the refreshment before a refreshing timer expires. There are a number of problems with existing soft state mechanisms:

The refreshing messages go out of wire individually. This approach is inefficient and consumes too many system resources overall.

The refreshing packets are sent randomly, which may generate traffic jitter.

The refreshing packets can flood the network due to broadcast storms. As a result, many control packets can be lost.

In a mobile WSN, the environment is highly dynamic because the nodes can move in random directions. This aspect requires seamless refreshing or updating. The current refreshing mechanisms do not support that.

This invention provides innovative solutions to resolve all these issues associating with the refreshment in an efficient and elegant way. In particular, this solution is appropriate for a mobile WSN where the communications among the nodes are frequent.

The new concepts defined in this invention include network elements, community, groups, subgroups, refreshing cycles and virtual socket. They are important building blocks for this invention.

DETAILED DESCRIPTION

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

This invention provides an optimized soft state refreshing framework for mobile WSN routing. The solution maximizes the flexibility, reliability of the processes while minimizing the resource consumption. Specifically, this invention extends the mobility to every node in a WSN.

This solution develops new mechanisms with a set of building blocks that shape the control traffic and smooth out the refreshing packets, thus effectively preventing the broadcast storms, packet losses and traffic jitters that are caused by the refreshment processes of the prior art. Further, this invention introduces entities such as a community, group, subgroup and refreshing cycles. With these building blocks, this solution creates new methodologies to overcome the shortfalls of existing approaches.

With the building blocks, this invention supports seamless refreshment that will be required in a mobile WSN. Further, it provides a prudent timer mechanism to simplify the refreshing processes.

The benefit of the virtual socket is to minimize the overhead of route advertisement without sacrificing the functionality. The combination of the beacon channel and socket channel ensure the completeness of the delivery service with the lowest cost.

This invention seeks to distribute the network elements to different communities, groups, and subgroups. A network element is an entity that owns sufficient flavors to generate a specific refreshing message. A network element can be a signaling entry, routing entry, or a network entity that makes sense. In one embodiment, the network elements are data routes.

In general, a collection of network elements that share the same attributes and refreshing time interval is distributed within a specific community. In one embodiment, the routing entries for adjacent nodes can be in one community. Their refreshing time interval is shorter than other communities.

Figure 1:
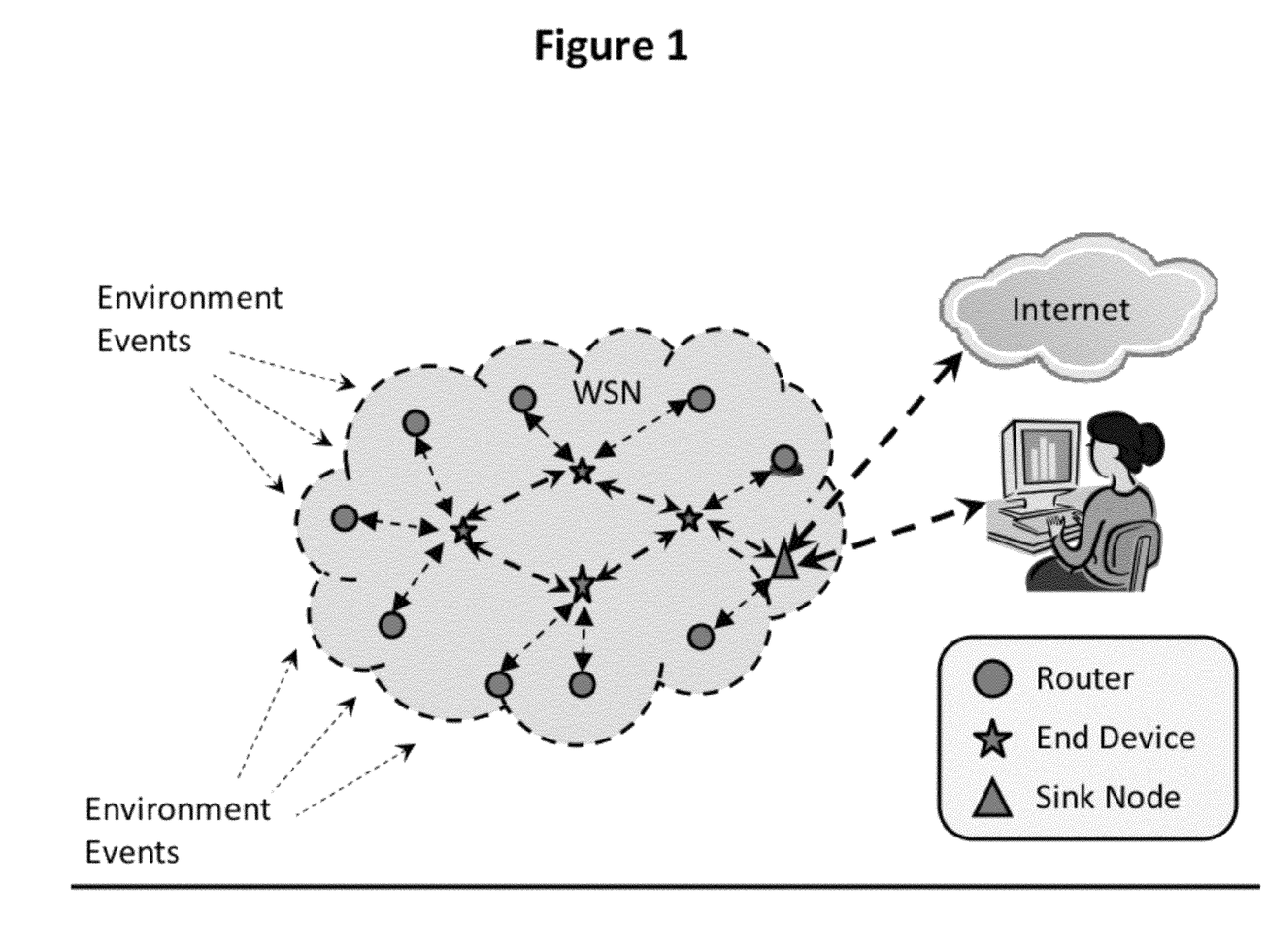
FIG. 1 shows an embodiment of an exemplary wireless sensor network.

FIG. 1 shows an embodiment of a WSN. The WSN consists of a plurality of network nodes including routers, shown as circles; end devices shown as stars; and a sink node shown as a triangle. These nodes are in communication with each other. The sink node allows communication directly to a central computer, or out to the internet. The network nodes are impacted by environment events which are sensed by the nodes.

Only the sink node and the router node have routing ability. Therefore, if every node in a WSN is mobile, then the WSN may have only the sink node and the router node, and may exclude the end nodes. However, in a WSN with some fixed nodes and some mobile nodes, end nodes may be utilized. As the present invention is directed to a routing protocol method, it is intended to be embedded in nodes with routing ability, i.e. sink nodes and router nodes.

Figure 2:
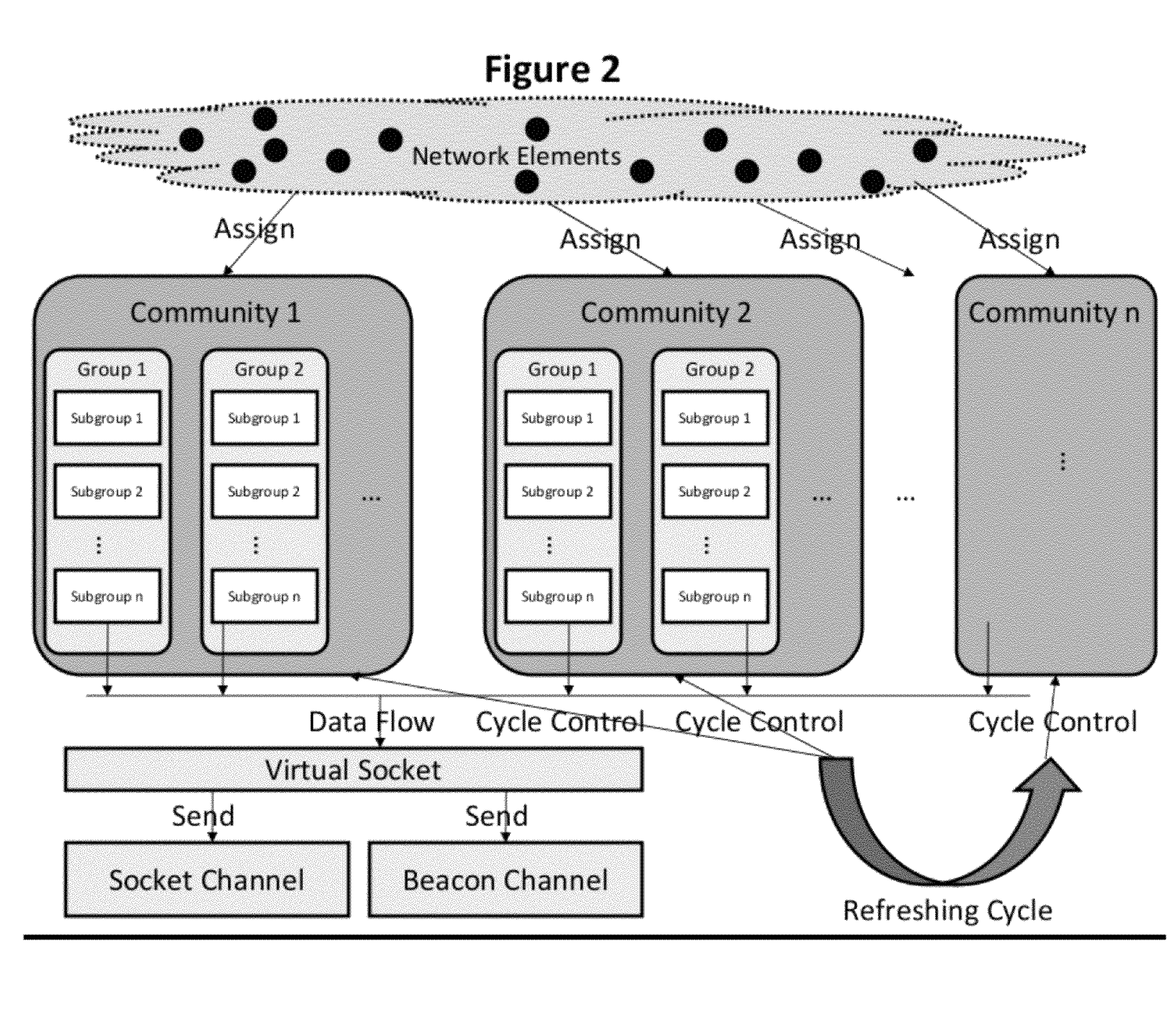
FIG. 2 shows an embodiment of the assignment organization and distribution of a plurality of network elements.

FIG. 2 shows an embodiment of the assignment organization and distribution of a plurality of network elements. A community consists of a collection of groups. A group represents a set of network elements for which the corresponding refreshing messages are sent at the same time.

A group can be divided into subgroups. A subgroup represents a set of network elements for which the corresponding refreshing messages are encapsulated into one packet. The size of a subgroup is constrained by, for example, the Maximum Transition Unit (MTU) value of the local node or other factors.

Figure 3:
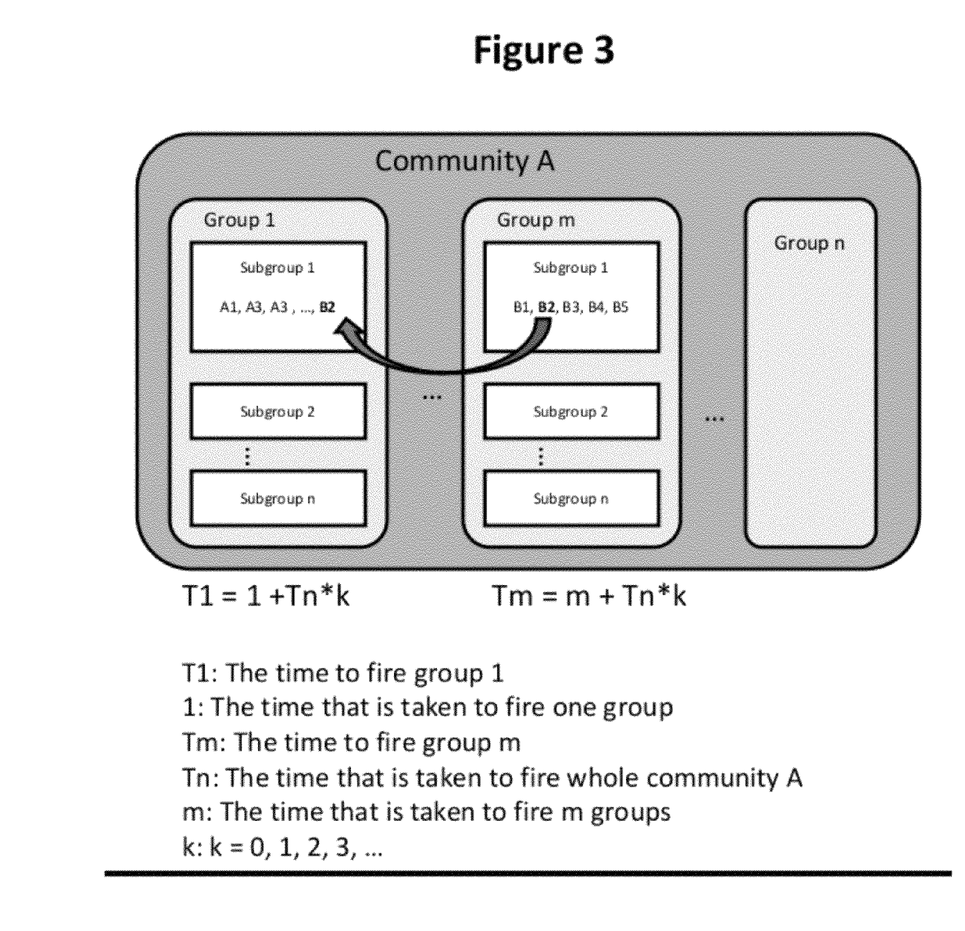
FIG. 3 provides an embodiment of the transfer of elements between groups and communities.

In FIG. 3, an embodiment of the transfer of elements from group to group is shown. The embodiment shown in FIG. 3 shows the element B2 transferred from group m to group 1, thus the phase is shifted from m to 1. The departing sequence of the groups is usually decided by group numbers. A network element can be transferred from one group to another dynamically. This feature allows an easy phase shift of refreshing cycle for an element.

The total number of communities, groups, and subgroups varies from application to application. The network elements are distributed to the community based on their attributes. The assignment of the groups is based on the specific needs and the evenness of the distribution. In one embodiment, a newly created element can be placed in a group that departs immediately; an existing element can be transferred to an earlier group before its deletion. In another embodiment, both elements can be transferred similarly to what is shown in FIG. 3. The present invention uses its flexibility to balance the rapid distribution of updated network elements, and at the same time providing a substantially consistent number of message transmission at a given time interval. The flexibility of group assignment and transference creates the baseline for seamless, reliable refreshing/updating that is critical in a mobile WSN.

The term attributes is defined herein to refer to specific characteristics of certain network elements. These specific characteristics are gathered in a community, and the community is configured to most efficiently address the needs of the elements with the similar characteristics. In one embodiment, the attributes of an element decide how frequently the element gets refreshed. An element that has attributes that require more frequent refreshing may be designated to a community that refreshes more frequently than other communities.

In one embodiment where the network element is a route with a destination of a neighboring node, the route may have an attribute called "adjacent node". This route may be assigned to an "adjacent node" community, which contains other network elements with adjacent node routes. This community may be refreshed relatively frequently because in the mobile WSN, an adjacent node affects a routing decision the most.

In another embodiment for a WSN having some mobile and some fixed nodes, the fixed nodes may have a relatively stable route path. The network elements that are routes corresponding to the fixed nodes may have an attribute called "fixed node" and these routes may be assigned to a "fixed node" community. This community may be refreshed relatively infrequently because the fixed node routes are relatively stable and reliable.

In an embodiment where the network element is a route with a destination of a mobile node, the route may be assigned to a "mobile node" community, which contains other network elements with mobile node routes. This community may be refreshed relatively frequently to moderately frequently.

Figure 4:
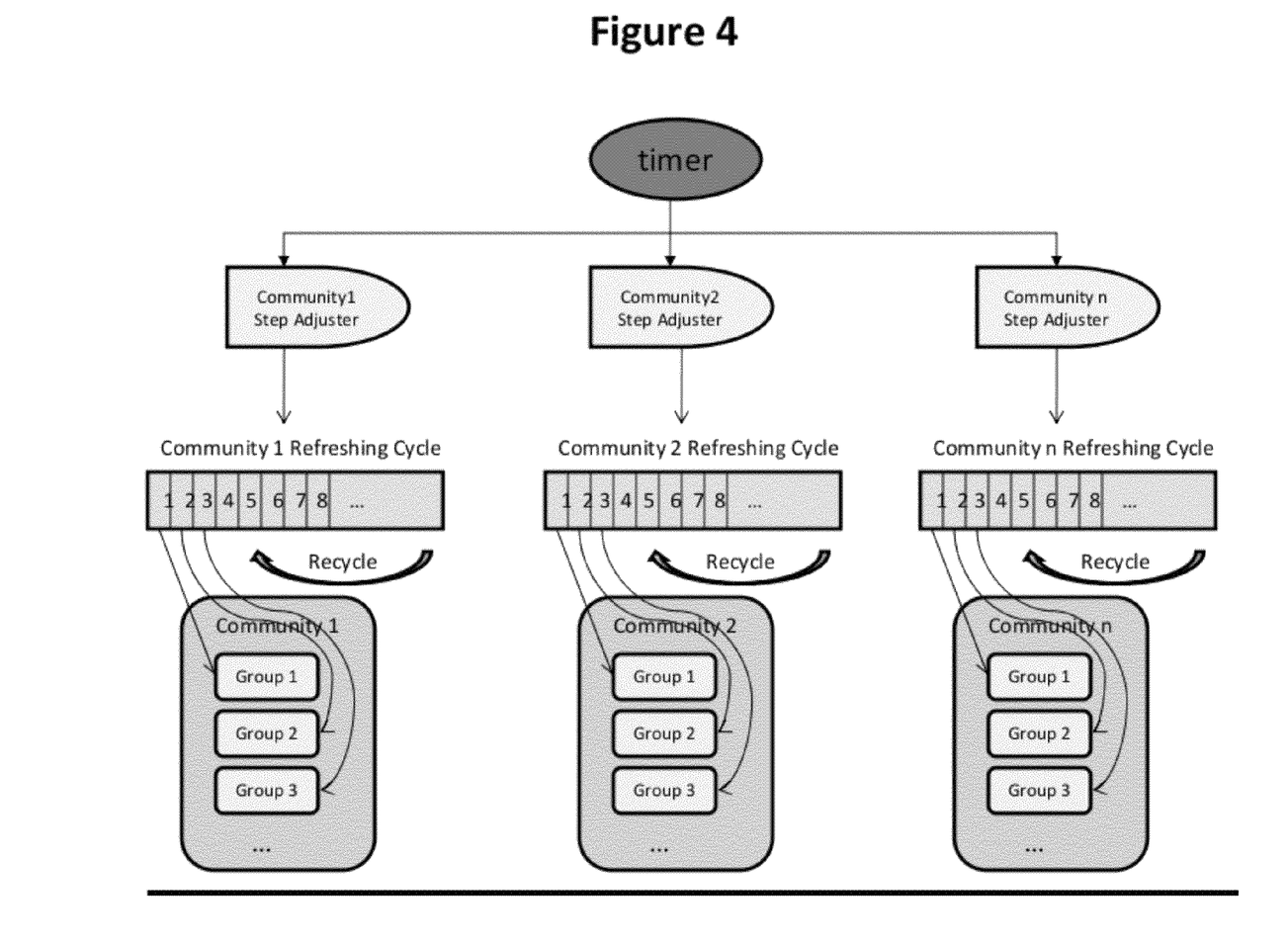
FIG. 4 provides an embodiment of the present invention that reflects periodic refreshing of groups of a community based on a single timer.

FIG. 4 illustrates the timer solution of the framework. The step adjuster adjusts the pace of the refreshing cycle by counting the number of the heartbeats. The number is adjustable. The refreshing cycle controls refreshing phases for each group. The refreshing cycles vary from community to community. Each refreshing cycle maintains a step account that increases when the step adjuster calls. The value of the step count is in a specific interval. The count starts over again once reaching its up boundary. Each value of the step count represents a slot that maps to a specific group. When the step count reaches the value of a slot, the corresponding group is refreshed, and sent to the adjacent nodes.

Figure 5:
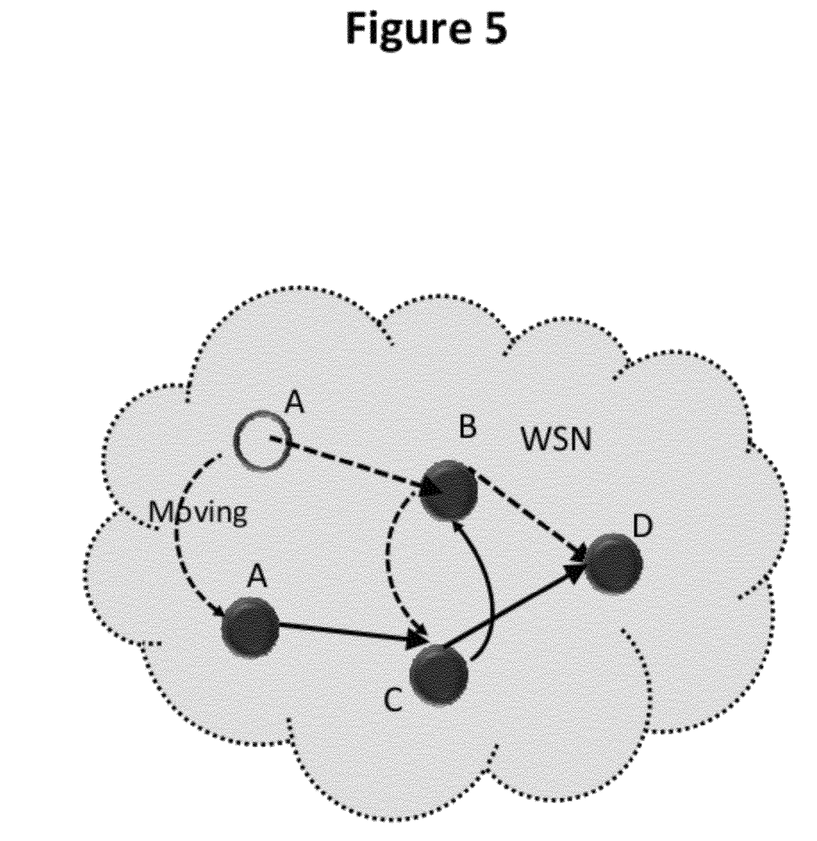
FIG. 5 provides an embodiment of the physical movement of node A in a wireless sensor network and the adjustment of network elements of nodes B, C, and D.

In this invention, the routes are advertised by periodical refreshing that reflect the dynamic position of the nodes in a mobile wireless sensor network. FIG. 5 shows an embodiment of the present invention that reflects this refreshing. In FIG. 5, node A is an arbitrary node in a WSN. It was originally located in top left corner. Node B sees it and advertises it via refreshing messages. Node A soon moves to the lower left corner. When node B notices the disappearance of node A (e.g. refreshing timeout), node B removes the element corresponding to the node A and optionally sends a delete message, therefore stopping the refreshing. In contrast, node C sees the node A and creates the element for it and inserts it to the appropriate community/group/subgroup. Therefore node C starts a refreshing cycle for node A. The new element corresponding to node A should be distributed to a group that is going to depart right away, because an earlier refreshment for node A minimizes the delay time for the adjacent nodes to gain the new routes reflecting the updates. The community/group/subgroup distribution mechanism provides an opportunity to shape the refreshing traffic in a desired way.

Figure 6:
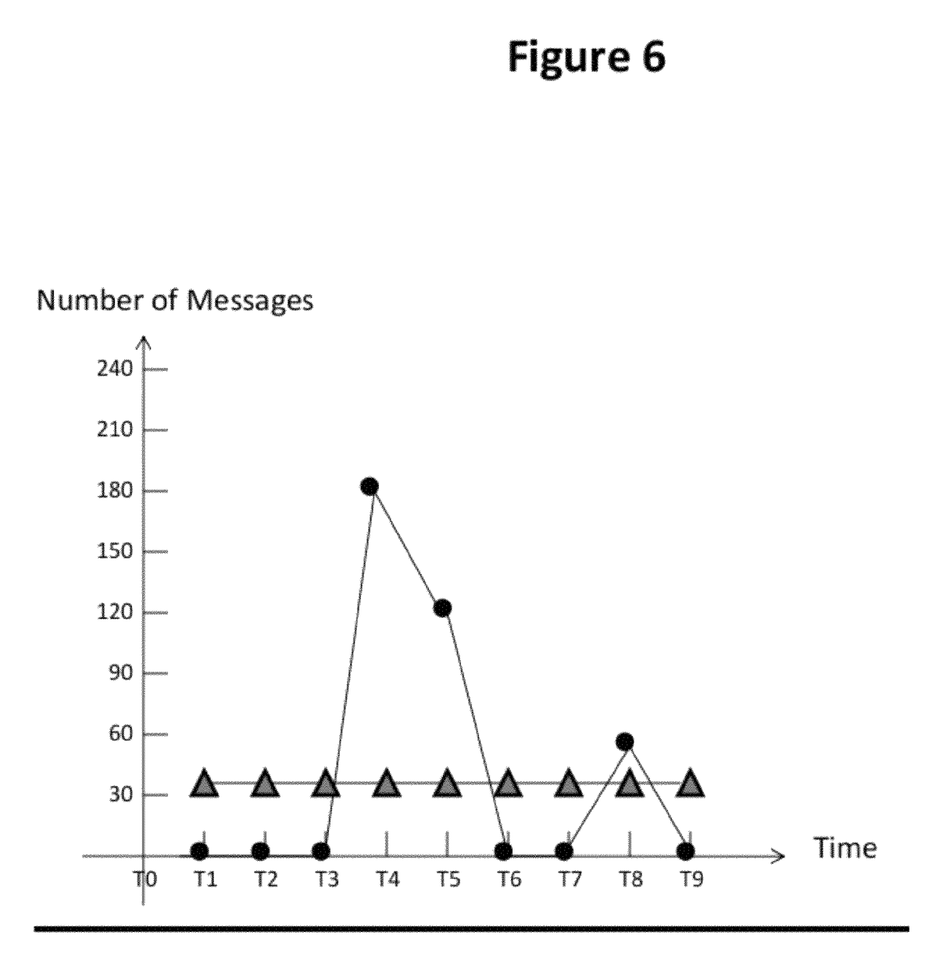
FIG. 6 provides a chart of messages sent over time in a conventional soft refreshing configuration compared to messages sent over time of the present invention.

In FIG. 6, an example of messages sent over time in a conventional soft refreshing configuration is shown. In FIG. 6, the horizontal axis represents the time sequence; the vertical axis represents the number of messages sent. The black dots represent the number of messages sent at specific time in conventional soft refreshing. Because the messages are sent randomly, there are no messages going out of wire at some times (e.g. T1, T2, T3, T6, T7, T9). On the other hand, there might be a burst of messages (e.g. T4) that causes traffic jam and loss of messages. In contrast, this invention is able to shape the refreshing traffic smoothly and evenly as it is showed in triangles. The present invention achieves this by evenly sending signals corresponding to the refreshing of substantially consistent sized groups, one group at a time.

In a WSN, the electric power is a precious resource. The package transmission consumes significant amount of energy. Most nodes are battery powered, and conservation of energy directly results in longer life of a node. It costs several times the energy of what the CPU consumes at same time. In traditional soft refreshing, messages are sent one at a time, which is very electronically inefficient. With this invention, refreshing messages are always sent by groups; therefore, the energy usage is greatly minimized.

Despite the number of communities, groups, subgroups, and network elements, only one timer is required in this invention. It greatly saves system resources. This timer is the heartbeat for all the refreshing cycles. The resolution of the timer is application specific; 1 second is the most common choice for applications.

The present invention further creates a virtual socket that significantly reduces the overhead caused by refreshment traffic or routing advertisement. The virtual socket encapsulates the details of the delivery mechanisms. The virtual socket sends the packets in two ways. The first way uses regular sockets, another uses the payload field of a beacon packet. In this invention, the former is called socket channel, the latter is called beacon channel. The beacon channel piggybacks the refreshing packet for a "free" ride. FIG. 1 provides an illustration of the virtual socket having a socket channel and a beacon channel.

The beacon signals are sent regularly. In beacon channel, the signaling packets piggyback the routing information so that the overheads of routing advertisement are minimized. The beacon channel lacks flexibility since the signals are sent by its own logic. The problem with that is the routing packets cannot be sent at will when the routes are created/changed/deleted or the random events occur. The socket channel is used to resolve this issue. The idea is to use beacon channel as a first choice. If it is not available, the socket channel is used. It should be noted that the clients of the virtual socket are not aware of its underlying details. In one embodiment, the format of a beacon packet along with its payload follows the IEEE 802.15.4 standard.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A routing protocol method for a wireless sensor network utilizing a network node comprising the steps of:
   identifying, by the network node, a plurality of network elements;
   organizing, by the network node, the plurality of network elements into a first community and a second community depending on attributes and refreshing time interval of each of the plurality of network elements between the first community and a second community;
   organizing, by the network node, the plurality of network elements of the first community into a first group and a second group depending on a changing condition of the plurality of network elements, specific needs of the plurality of network elements and an evenness of distribution of the plurality of network elements between the first group and the second group;

refreshing periodically and dynamically the plurality of network elements belonging to the first community and the second community;

timing the refreshing of the plurality of network elements using only one timer, the only one timer refreshing different groups of the first and second communities at different times the only one timer timing the refreshing of the first community by using a step count having a plurality of steps, each step corresponding to one group of the first community, the step count refreshing the corresponding group once each step is reached, and increasing incrementally after each refreshing based on the timer, the step count recycling to an initial step after a final step corresponding to a final group of the first community, the only one timer timing the refreshing of the second community by using a second step count having a plurality of steps, each step corresponding to one group of the second community, the step count refreshing the corresponding group once each step is reached, and increasing incrementally after each refreshing based on the timer, the step count recycling to an initial step after a final step corresponding to a final group of the second community;

sending a first plurality of refreshing packets containing routing information that reflects the content of the refreshed first group of the first community via a virtual socket to a second network node; and sending a second plurality of refreshing packets containing routing information that reflects the content of the refreshed second group of the first community via a virtual socket to a second network node at a different time from the sending of the first plurality of refreshing packets.

2. The routing protocol method for a wireless sensor network utilizing a network node of claim 1 wherein the plurality of network elements are a plurality of different network routes.

3. The routing protocol method for a wireless sensor network utilizing a network node of claim 1 further comprising the steps of:
changing a physical location of the network node; and
re-organizing the plurality of network elements into the first community, the second community, the first group or the second group based at least partially on the change in physical location of the network node.

4. The routing protocol method for a wireless sensor network utilizing a network node of claim 1 comprising the step sending a substantially consistent number of the plurality of refreshing packets reflecting the content of the refreshed community at each of the plurality of different time intervals.

5. The routing protocol method for a wireless sensor network utilizing a network node of claim 1 further comprising the step of optimizing electrical efficiency by sending the refreshing packet relating to each of the plurality of network elements in the first community.

6. The routing protocol method for a wireless sensor network utilizing a network node of claim 1 wherein the step of sending a refreshing packet is performed wirelessly.

7. The routing protocol method for a wireless sensor network utilizing a network node of claim 1 wherein the step of sending via the virtual socket comprises sending of the refreshing packet via either a beacon channel or a socket channel.

8. The routing protocol method for a wireless sensor network utilizing a network node of claim 1:
wherein the step of refreshing a network element maintains a soft state framework; and
wherein failing to refresh the network element removes the soft state framework.

9. The routing protocol method for a wireless sensor network utilizing a network node of claim 1 further comprising the step of organizing, by the network node, the plurality of network elements of the first group into a first sub-group and a second sub-group depending at least partially on the maximum transition unit value of the network node.

10. The routing protocol method for a wireless sensor network utilizing a network node of claim 1 further comprising the step of refreshing periodically and dynamically the plurality of network elements belonging to the first group and the second group depending on the changing conditions of the plurality of network elements, specific needs of the plurality of network elements and the evenness of distribution of the plurality of network elements between the first group and the second group.

11. The routing protocol method for a wireless sensor network utilizing a network node of claim 10 further comprising the step of sending a refreshing packet reflecting the content of the refreshed first group via the virtual socket to the second network node.

12. The routing protocol method for a wireless sensor network utilizing a network node of claim 9 further comprising the step of refreshing periodically and dynamically the plurality of network elements belonging to the first sub-group and the second sub-group depending at least partially on the maximum transition unit value of the network node.

13. The routing protocol method for a wireless sensor network utilizing a network node of claim 12 further comprising the step of sending a refreshing packet reflecting the content of the refreshed first sub-group via the virtual socket to the second network node.

14. The routing protocol method for a wireless sensor network utilizing a network node of claim 1 wherein the routing protocol method is employed by a plurality of network nodes comprising a sink node, and a router node further comprising the step of moving physically the plurality of network nodes.

15. A routing protocol method for a wireless sensor network utilizing a plurality of network nodes comprising a sink node and a router node, comprising the steps of:
moving each of the plurality of network nodes randomly in a three dimensional space;
communicating wirelessly between each of the network nodes;
utilizing each of the plurality of network nodes to perform steps comprising:
identifying a plurality of network elements;
organizing the plurality of network elements into a first community and a second community depending on attributes and refreshing time interval of the plurality of network elements between the first community and the second community;
organizing the plurality of network elements of the first community into a first group and a second group depending on a changing condition of the plurality of network elements, specific needs of the plurality of network elements and the evenness of distribution of the plurality of network elements between the first group and the second group;
refreshing periodically and dynamically the plurality of network elements belonging to the first community and the second community;
timing the refreshing of the plurality of network elements using only one timer, the only one timer refreshing different groups of the first and second communities at different times the only one timer timing the refreshing of the first community by using a step count having a plurality of steps, each step corresponding to one group of the first community, the step count refreshing the corresponding group once each step is reached, and increasing incrementally after each refreshing based on the timer, the step count recycling to an initial step after a final step corresponding to a final group of the first community, the only one timer timing the refreshing of the second community by using a second step count having a plurality of steps, each step corresponding to one group of the second community, the step count refreshing the corresponding group once each step is reached, and increasing incrementally after each refreshing based on the timer, the step count recycling to an initial step after a final step corresponding to a final group of the second community; and sending a refreshing packet reflecting the content of each refreshed community via a virtual socket to another one of the plurality of network nodes.

16. The routing protocol method for a wireless sensor network utilizing a plurality of network nodes of claim 15 further comprising the step of evenly spreading the distribution of the refreshing of the first and second communities over time; and avoiding flooding, jitter and packet loss of a contents of the routing packet.

17. The routing protocol method for a wireless sensor network utilizing a plurality of network nodes of claim 16 wherein the plurality of network elements are a plurality of routes.

18. The routing protocol method for a wireless sensor network utilizing a plurality of network nodes of claim 17 wherein the plurality of network nodes further perform the steps of:

refreshing periodically and dynamically the plurality of network elements belonging to the first group and the second group depending on the changing conditions of the plurality of network elements, specific needs of the plurality of network elements and the evenness of distribution of the plurality of network elements between the first group and a second group;

sending a refreshing packet reflecting the content of the refreshed first group via the virtual socket to another one of the plurality of network nodes;

refreshing periodically and dynamically the plurality of network elements belonging to the first sub-group and the second sub-group depending at least partially on the maximum transition unit value of the network node;

sending a refreshing packet reflecting the content of the refreshed first sub-group via the virtual socket to another one of the plurality of network nodes.

19. A routing protocol method for a wireless sensor network utilizing a plurality of network nodes comprising the steps of:

moving each of the plurality of network nodes randomly in a three dimensional space;

communicating wirelessly between each of the network nodes;

utilizing each of the plurality of network nodes to perform steps comprising:

identifying a plurality of network elements;

organizing, by the network node, the plurality of network elements into a first community and a second community depending on the attributes and refreshing time interval of the plurality of network elements between the first community and a second community;

organizing the plurality of network elements of the first community into a first group and a second group depending on a changing condition of the plurality of network elements, specific needs of the plurality of network elements and the evenness of distribution of the plurality of network elements between the first group and the second group;

refreshing periodically and dynamically the plurality of network elements belonging to the first community and the second community;

timing the refreshing of the plurality of network elements using only one timer, the only one timer refreshing different communities at different times;

sending a routing packet reflecting the content of each refreshed community via a virtual socket to another one of the plurality of network nodes;

refreshing periodically and dynamically the plurality of network elements belonging to the first group and the second group depending on the changing conditions of the plurality of network elements, specific needs of the plurality of network elements and the evenness of distribution of the plurality of network elements between the first group and a second group;

sending a routing packet reflecting the content of the refreshed first group via the virtual socket to another one of the plurality of network nodes;

refreshing periodically and dynamically the plurality of network elements belonging to the first sub-group and the second sub-group depending at least partially on the maximum transition unit value of the network node;

sending a routing packet reflecting the content of the refreshed first sub-group via the virtual socket to another one of the plurality of network nodes;

wherein the step of refreshing a network element maintains a soft state framework;

wherein failing to refresh the network element removes the soft state framework;

wherein the step of sending via the virtual socket comprises sending of a routing packet via both a beacon channel and a socket channel;

changing the physical location of one of the plurality of network nodes; and wherein upon changing the physical location, each of the plurality of network nodes performs the steps of:

re-organizing the plurality of network elements of the first and second community based at least partially on the change in physical location of the one of the plurality of network nodes;

refreshing periodically and dynamically the plurality of network elements belonging to the first community and the second community;

timing the refreshing of the plurality of network elements using only one timer, the only one timer refreshing different communities at different times; and sending a routing packet reflecting the content of the refreshed and re-organized community via a virtual socket to another of the plurality of network nodes.

* * * * *